May 28, 1957     M. E. CUSHMAN     2,793,702
SPINNER FAIRING AND SEAL
Filed May 8, 1953     3 Sheets-Sheet 1
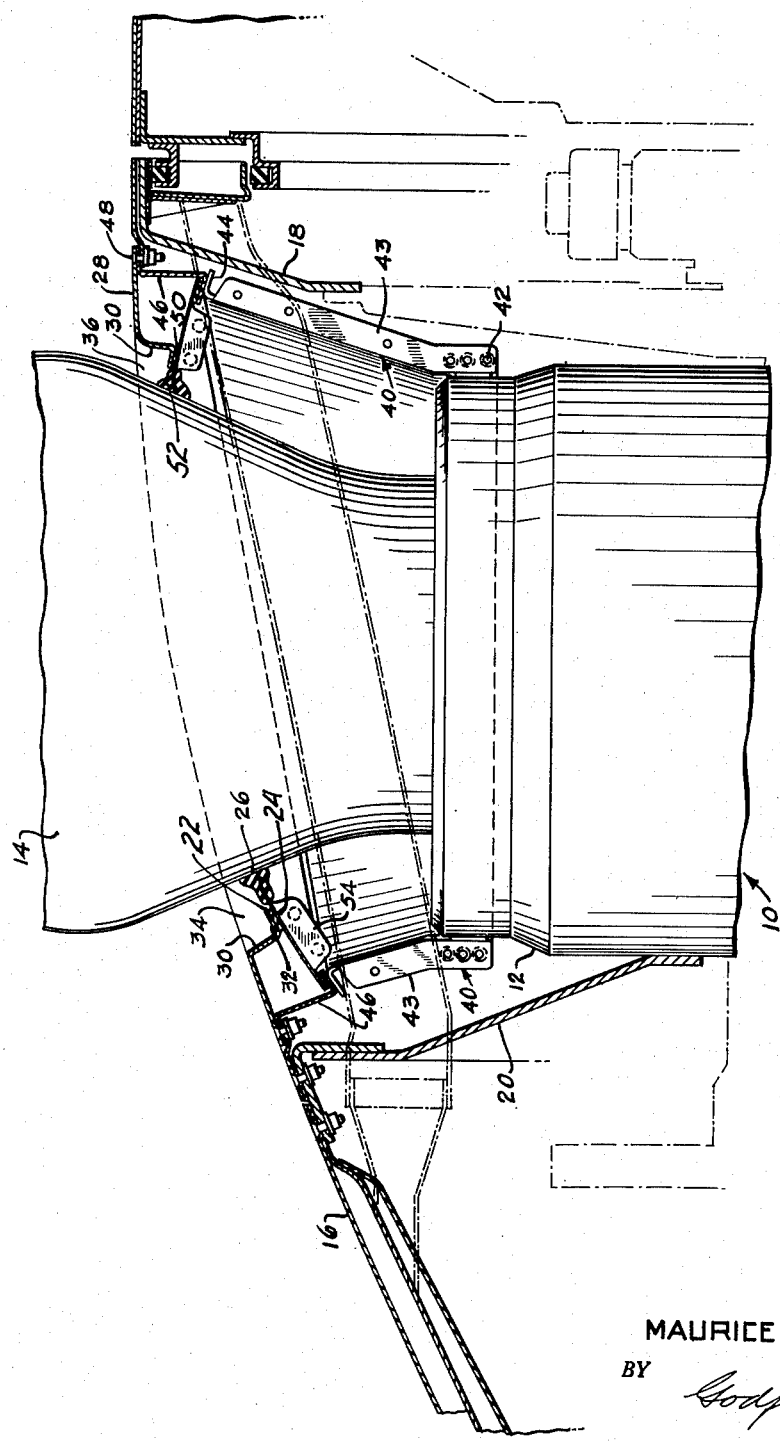
INVENTOR.
MAURICE E. CUSHMAN
BY
ATTORNEY

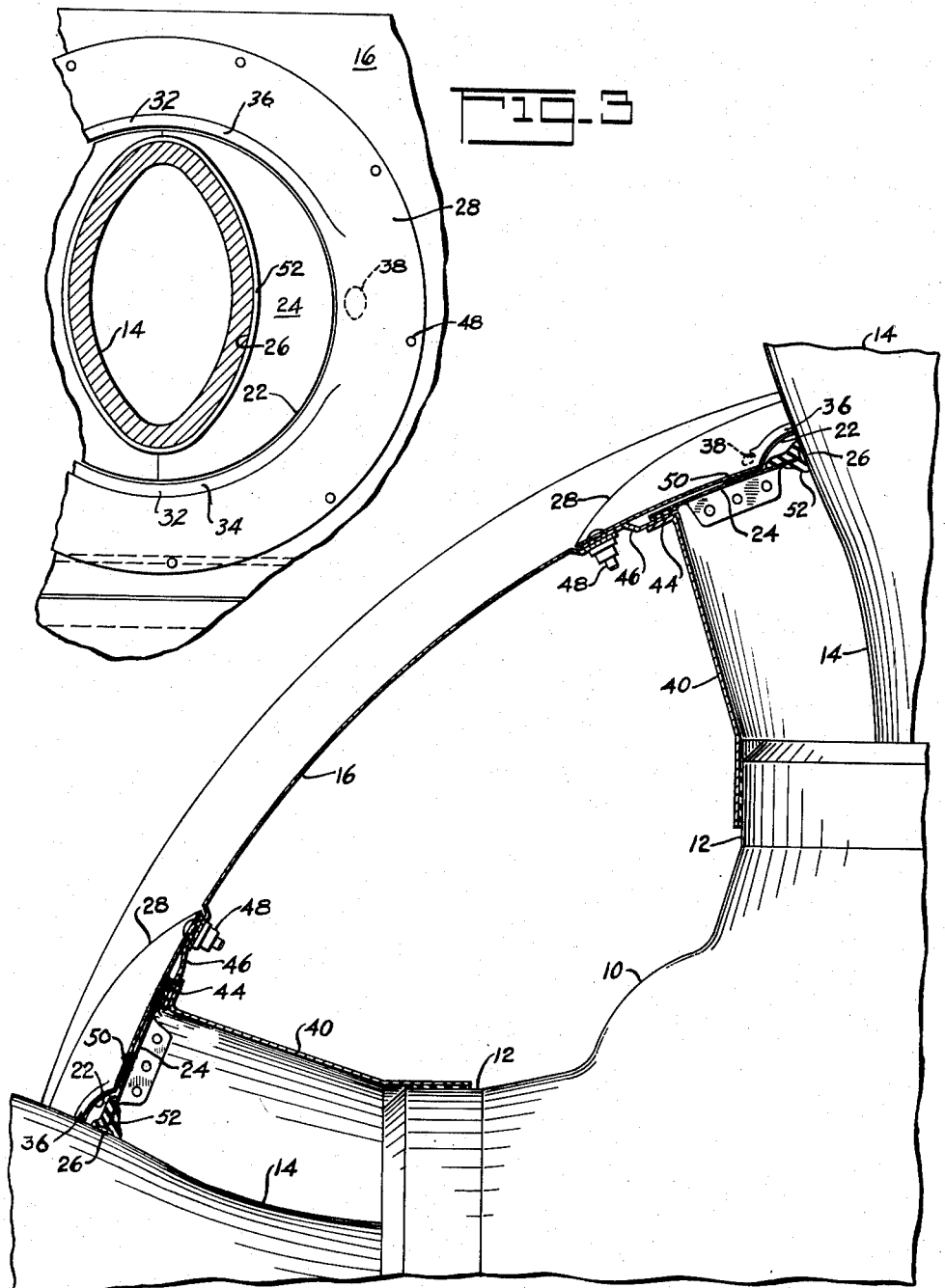

United States Patent Office 2,793,702
Patented May 28, 1957

2,793,702

SPINNER FAIRING AND SEAL

Maurice E. Cushman, Verona, N. J., assignor to Curtiss-Wright Corporation, a corporation of Delaware Application May 8, 1953, Serial No. 353,864

15 Claims. (Cl. 170—160.23)

This invention relates to propeller installations for aircraft and is concerned particularly with improvements in spinners and in means for the streamlining of spinners in the region where the propeller blades project through openings in the spinner.

With the development of high speed propeller-driven aircraft, streamlining refinements become necessary to enable drag reduction. When streamlined spinners are arranged to embrace the hubs of propellers, a problem arises in streamlining or fairing the openings in the propeller spinner through which the propeller blades project. Since the blades are required to change blade angle through a range of approximately 120°, the hole in the spinner is somewhat larger than the propeller blade and unless this hole is covered and faired into the spinner contour, a substantial drag increase will prevail. It is an object of the present invention to provide spinner fairings and seals to cover such openings, which will be effective from a structural standpoint yet relatively simple. Spinner seals have been shown in the prior art, one being exemplified in Dean Patent No. 2,498,072, issued February 21, 1950, and assigned to the assignee of the present invention.

While the development of appropriate spinner seals seems to be a simple problem, considerable difficulty has arisen in the past. The seals are usually fabricated from sheet metal and are applied to the sheet metal spinner by various sorts of securing and bearing means, whereby the spinner seal is free to rotate with the propeller blade as the latter changes pitch. Since a primary design requirement is the minimization of weight, the spinner seal and attaching components are made as light as possible. Unfortunately, the spinner seal operates in a centrifugal field of considerable magnitude and is thereby subjected to stresses which require the attaching components, and the seal itself, to be very strong and stiff, stiffness being necessary to avoid distortion of parts. In view of difficulties experienced with prior types of spinner seal arrangements, the improvements of this invention have been evolved.

In general, my spinner seal may be considered as a compromise to provide quite efficient, but not perfect, streamlining of the spinner along with a rugged construction which will be effective in service and which will not be susceptible to the failures which have been experienced with prior types of spinners. I provide spherically segmental spinner seal discs of considerably larger diameter than the blade width at the blade station intercepted by the seal disc. I further provide track arrangements by which the seal disc is firmly supported in the spinner, and auxiliary sealing arrangements which will prevent the interflow of air which may leak past the spinner seal, within the spinner and between the spinner seals of the several propeller blades.

The arrangements of the spinner seal of this invention are shown in the attached drawings in which similar reference characters represent similar parts, and in which Fig. 1 is a longitudinal section through a portion of a spinner and seal arrangement according to the invention;

Fig. 2 is a transverse section through the embodiment of the invention shown in Fig. 1;

Fig. 3 is a plan of a portion of the spinner showing the circular configuration of the spinner seal;

Figure 4:
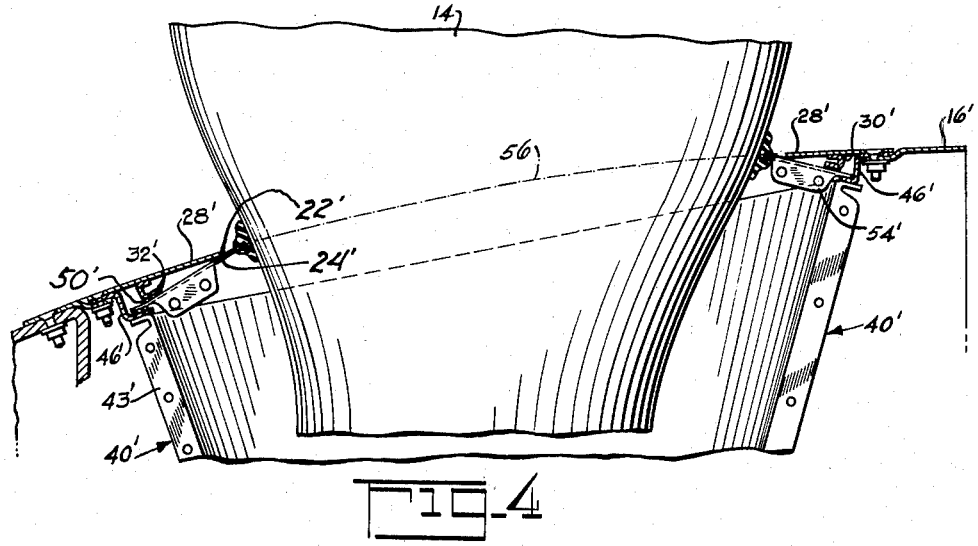
Fig. 4 is a longitudinal section of a portion of a spinner showing an alternative embodiment of the invention.

Referring first to Figs. 1, 2 and 3, a propeller hub 10 includes a plurality of blade sockets 12, each blade socket having a blade 14 journaled therein in any appropriate manner for pitch changing rotation. The blades are shown in substantially flat pitch in Fig. 2 and in substantially feathered pitch in Figs. 1 and 3.

Embracing the hub 10 and secured thereto is a streamlined spinner 16 which is secured to the hub by annular bulkheads 18 and 20 so that the spinner rotates with the propeller hub. The spinner 16 is usually ogival in form for optimum drag reduction. The curvature of the spinner, longitudinally, is considerably less than the curvature of the spinner in the plane of rotation. Thus, the curvature of the spinner surface in the region of the propeller blade is compound, making it difficult to provide a spinner seal which will conform at all times to the spinner profile both longitudinally and transversely, as the propeller blade 14 changes in pitch.

The spinner 16 is provided with a fairing segment 28 forming part of the spinner, having openings 22 through which the propeller blades project. According to this invention, for each propeller blade I provide a seal or fairing disc 24 provided with an opening 26, the latter being conformed to the cross-sectional profile of the propeller blade, the disc 24 having its center substantially coincident with the axis of pitch changing rotation of the propeller blade. The disc 24 is formed as an inherently stiff spherical segment the radius of curvature of which is substantially the same as the radius of the spinner in the plane of propeller rotation. Thus, the disc 24 lies in the curvature of the spinner 16 in the plane of rotation as shown in Fig. 2, but the disc curvature is substantially sharper than curvature of the spinner in a longitudinal direction, as shown in Fig. 1. In order to minimize the disturbance of spinner profile in the longitudinal direction, Fig. 1, I provide the fairing segment or spinner part 28, secured to the spinner 16, and which defines the opening 22 through which the propeller blade projects. The outer portion of each fairing segment 28 forms part of the spinner and is conformed to the compound curvature of the spinner, but the inner portions, adjacent the cutout opening 22, are conformed inwardly as at 30 ahead of and behind the propeller plane of rotation, whereby the edge of the opening 22 describes a planar circle. This edge is further formed as at 32 with a flange which provides a bearing abutment which the seal disc 24 engages.

As a result of this configuration, there is a portion 34 which is indented with respect to the spinner profile ahead of the propeller plane of rotation, and another portion 36 indented relative to the spinner profile behind the plane of rotation. These dented portions fade out as at 38 (Fig. 3) at the plane of rotation. While these indented portions 34 and 36 provide a slight discontinuity in the longitudinal profile of the spinner surface, they do not produce any material increase in spinner drag since they provide sealed air pockets from which air cannot bleed to upset the laminar air flow over the spinner surface.

To assure non-leakage of air in an outward direction from the spinner interior, a baffling sleeve 40 preferably conical in form is clamped around each hub socket 12, the sleeve 40 as shown being formed in two semi-conical parts clamped to each other at their edges, and around the hub socket at 42 and extending outwardly to a circular flange 44 providing a bearing ring for the outer edge of the seal disc 24. The sleeve halves have edge flanges 43 to enable their attachment to one another. The flange 44 lies in a plane which is parallel to the plane of the flange 32 and supports the seal disc 24 from inward displacement when the propeller is not rotating. The flange 44 is further secured to a continuation 46 of the sleeve 40 which is sealingly fitted to the inner surface of the spinner 16 and fairing segment 28 and secured as by screws 48, these screws also serving to secure the fairing segments or spinner parts 28 to the spinner shell. Should there tend to be leakage of air from the large cavity within the spinner and around the propeller hub toward the openings through which the propeller blades project, the sleeve 40, 46 will prevent such leakage, thereby improving the aerodynamic characteristics of the spinner surface.

In order to reduce friction during rotation of the seal disc 24 with the propeller blades, low friction gaskets 50 are disposed between the circular flanges 32 and the outer surface of the seal discs 24. Also, a suitable gasket 52 is disposed around the opening 26 in each seal disc 24 to engage the outer surface of the propeller blade 14. As the propeller blade 14 rotates for pitch change, it enforces corresponding movement of the seal disc 24, and the seal disc tilts in different directions with respect to the propeller blade, since the plane of the track 32 is tilted relative to the blade axis. Accordingly, the edge of the opening 26 in the disc 24 requires some clearance relation to the propeller blade.

In the fabrication of the various components heretofore described, appropriate forming of the members is accomplished to make the overall external surface of the spinner 16, the segments 28 and the seal discs 24 as smooth as possible for aerodynamic cleanness.

A further feature of the invention resides in the construction of the seal discs 24 with a diameter which is considerably in excess of the major diameter of the opening 26 in the seal disc. Since this opening 26 is of more or less elliptical shape, the strength of the seal disc 24 is materially reduced if the seal disc diameter is only slightly greater than the major diameter of the opening 26. By making the seal disc large, as shown in the drawings, there is ample disc material particularly at the ends of the oval cutout 26 to keep the stiffness and strength of the disc large enough so that it will not warp or deform in operation. Still, by virtue of the fairing segment 28 and the circular track 32, the effective size of the deformed areas 34 and 36 is minimized, the disc 24 being extended diametrically beyond the track 32 within the spinner. Furthermore, the discs 24 may readily be constructed in two halves which may be joined together around the propeller blade and secured to each other by bolts engaging flanges 54 formed on the adjoining edges of the half discs, preferably adjacent the leading and trailing edges of the blade 14.

Figure 5:
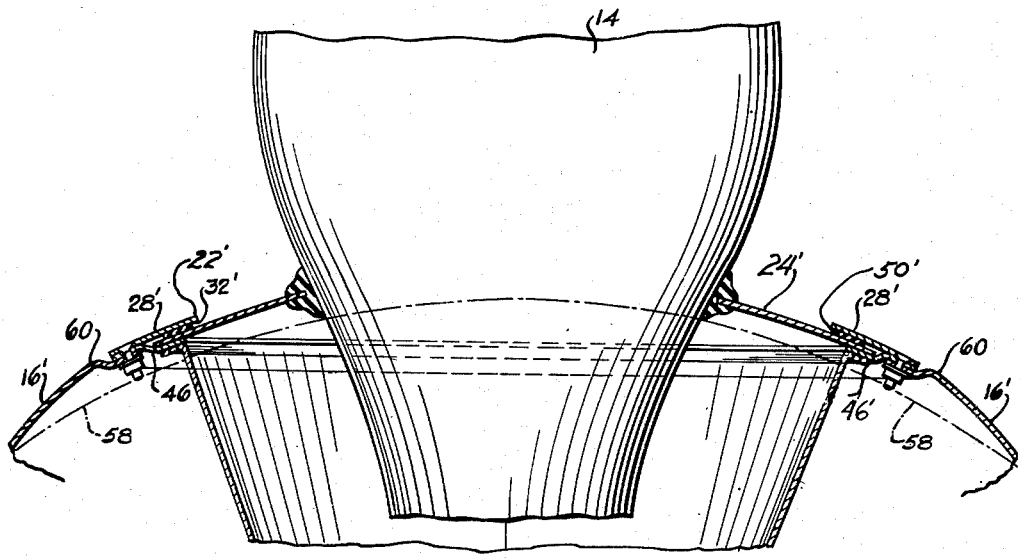
Fig. 5 is a transverse section through a portion of a spinner according to the invention as shown in Fig. 4.

In Figs. 4 and 5 a modification of the foregoing arrangement is disclosed wherein many of the structural components are similar to those previously described. Slightly modified components are given the same reference characters, primed, as have been used previously. In this arrangement, the spinner 16' as shown in Fig. 5 is bulged outwardly near each propeller blade at 60 and in the propeller plane of rotation, whereby fairing segment 28' is not indented as in the prior embodiment. Rather, as shown in Fig. 4, the fairing segment 28' lies substantially in the streamlined profile of the spinner 16' in the longitudinal direction, and the spinner seal discs 24' protrude slightly beyond the normal spinner profile designated by the line 56. In the transverse profile (Fig. 5), the spinner seal disc 24' lies a small distance outwardly from the circle 58 which represents what would be the normal spinner diameter in the plane of rotation if the spinner 16' were not bulged as at 60. This construction avoids the indentations 34 and 36 of the first embodiment but results in protuberances 60 which have only a slight effect in increasing drag of the spinner system.

Since the fairing segments 28' extend toward the blade to intersection with the seal discs 24', curved tapered brackets or spacers 30' are secured to the insides of segments 28', ahead of and behind the plane of propeller rotation, to form tracks 32'. These tracks are planar and support the discs 24' against outward displacement. Low-friction gaskets 50' lie between tracks 32' and discs 24' to allow free rotation of the discs relative to the tracks.

The arrangements of Figs. 1–3 or Figs. 1–5 may be analysed for any particular aircraft configuration and the one having minimum drag characteristics would, of course, be preferable. It will be clear that a configuration could readily be designed which is a compromise between the two embodiments of the invention shown, wherein the protrusions 60 would be reduced and wherein the indented portions 34 and 36 of the first embodiment could be made more shallow.

In either event, both embodiments enable construction of a spinner seal and fairing system whose structural integrity is superior to the flexible discs proposed in the prior art and whose drag characteristics are superior to other configurations shown in the prior art, most of which require substantial discontinuities, cavities or bulges in the spinner profile.

Though two embodiments of the invention are shown, it is to be understood that the invention may be applied in various forms and in various environments. Changes may be made in the arrangements shown without departing from the spirit of the invention. Reference should be had to the appended claims for definition of the limits of the invention.

What is claimed is:

1. In a propeller including a hub, variable pitch blades extending substantially radially therefrom and a generally conical spinner embracing the hub, said spinner having openings through which pass the shanks of said blades, said spinner surface having a relatively slight sloped curvature fore-and-aft and a relatively greater curvature transversely, a spherically segmental closure disc having a radius of curvature substantially the same as that of the transverse spinner curvature, embracing each blade and lying within said spinner in a position to close each blade opening and rotatable on an axis tilted relative to the blade axis and substantially normal to the spinner contour, and segmental inwardly extending flanges on the spinner ahead of and behind the blade plane of rotation depressed below the spinner surface, the spinner adjacent the opening transverse edges being a continuation of the normal spinner profile substantially in the plane of rotation, said flanges together with said opening transverse edges defining a circular track on the spinner for relatively movable engagement by said closure disc.

2. In a generally conical spinner for a bladed propeller, the spinner having circular cross section in the propeller plane of rotation and having lesser and sloped curvature longitudinally, said spinner having a circular opening for projection therethrough of a blade of the propeller, the spinner adjacent the edges of said opening and forward and rearward of the plane of propeller rotation being depressed below the spinner surface and comprising segmental flanges formed inwardly of the spinner contour, the spinner adjacent the transverse edges of said opening being a continuation of the normal spinner profile substantially in the plane of rotation, the edges of said flanges and transverse edge portions jointly defining a planar circular track having its axis tilted relative to the axis of the associated blade, and a spherically segmental seal disc engaging said track and rotatable relative thereto, said seal disc embracing the blade of said propeller and rotatable therewith and movable relative thereto.

3. In a generally conical spinner for a bladed propeller, the spinner having circular cross section in the propeller plane of rotation and having lesser and sloped curvature longitudinally, said spinner having a circular opening for projection therethrough of a blade of the propeller, the spinner adjacent the edges of said opening and forward and rearward of the plane of propeller rotation comprising inwardly formed flanges, the edges of said flanges jointly defining a planar circular track having its axis tilted relative to the axis of the associated blade, a spherically segmental seal disc engaging said track and rotatable relative thereto, said seal disc embracing the blade of said propeller and rotatable therewith and movable relative thereto, said propeller having a socket within which the blade is secured, and a substantially conical sleeve secured to and around the socket extending outwardly and around the shank of the propeller blade to the inner surface of said spinner and secured at its outer end to said spinner.

4. In a generally conical spinner for a bladed propeller, the spinner having circular cross section in the propeller plane of rotation and having lesser and sloped curvature longitudinally, said spinner having a circular opening for projection therethrough of a blade of the propeller, the spinner adjacent the edges of said opening and forward and rearward of the plane of propeller rotation comprising inwardly formed flanges, the edges of said flanges jointly defining a planar circular track having its axis tilted relative to the axis of the associated blade, a spherically segmental seal disc engaging said track and rotatable relative thereto, said seal disc embracing the blade of said propeller and rotatable therewith and movable relative thereto, said propeller having a socket within which the blade is secured, a substantially conical sleeve secured to and around the socket extending outwardly and around the shank of the propeller blade to the inner surface of said spinner and secured at its outer end to said spinner, and a track formed on said sleeve engaging an inner surface edge of said disc to hold the latter against inward movement.

5. In a spinner mounted on a propeller, the propeller comprising a hub having sockets and blades journalled in said sockets for pitch-changing rotation, said spinner having a substantially circular opening concentric with the blade through which the blade projects, an imperforate sleeve embracing the portion of the blade within said spinner sealingly secured at its inner end to the hub socket, and sealinginly secured at its outer end to the spinner adjacent the edge of said circular opening.

6. In a spinner mounted on a propeller, the propeller comprising a hub having sockets and blades journalled in said sockets for pitch-changing rotation, said spinner having a substantially circular opening concentric with the blade through which the blade projects, an imperforate sleeve embracing the portion of the blade within said spinner sealingly secured at its inner end to the hub socket, and sealingly secured at its outer end to the spinner adjacent the edge of said circular opening, a planar circular track formed on said spinner adjacent the edge of said opening and embraced by said sleeve, and a fairing disc embracing the blade and engaging said track.

7. In a spinner mounted on a propeller, the propeller comprising a hub having sockets and blades journalled in said sockets for pitch-changing rotation, said spinner having a substantially circular opening concentric with the blade through which the blade projects, an imperforate sleeve embracing the portion of the blade within said spinner sealingly secured at its inner end to the hub socket, and sealingly secured at its outer end to the spinner adjacent the edge of said circular opening, a planar circular track formed on said spinner adjacent the edge of said opening and embraced by said sleeve, a fairing disc embracing the blade and engaging said track, and a second circular track concentric with the first track and disposed inwardly thereof to support said disc against inward movement, said second track being secured to said sleeve.

8. In a spinner mounted on a propeller, the propeller comprising a hub having sockets and blades journalled in said sockets for pitch-changing rotation, said spinner having a substantially circular opening concentric with the blade through which the blade projects, an imperforate sleeve embracing the portion of the blade within said spinner sealingly secured at its inner end to the hub socket, and sealingly secured at its outer end to the spinner adjacent the edge of said circular opening, a planar circular track formed on said spinner adjacent the edge of said opening and embraced by said sleeve, and a fairing disc embracing the blade and engaging said track, said disc having a diameter substantially in excess of the blade chord at the blade stations intercepted by said disc.

9. In a spinner mounted on a propeller, the propeller comprising a hub having sockets and blades journalled in said sockets for pitch-changing rotation, said spinner having a substantially circular opening concentric with the blade through which the blade projects, an imperforate sleeve embracing the portion of the blade within said spinner sealingly secured at its inner end to the hub socket, and sealingly secured at its outer end to the spinner adjacent the edge of said circular opening, a planar circular track formed on said spinner adjacent the edge of said opening and embraced by said sleeve, and a fairing disc embracing the blade and engaging said track, said disc having a diameter substantially 1½ times the blade chord at the blade stations intercepted by said disc.

10. In a spinner mounted on a propeller, the propeller comprising a hub having a socket from which a blade projects substantially radially through an opening in the spinner, said spinner having a generally conical compound-curved surface, inwardly disposed flanges beneath the spinner surface on the spinner bordering parts of the blade opening ahead of and behind the propeller plane of rotation, the transverse parts of the edges not being depressed in the plane of rotation, the inner edges of said flanges and said transverse parts defining a circular track which intercepts the normal surface of the spinner at at least two points adjacent said transverse parts, and a closure disc for said opening, bearing on said track and embracing said propeller blade and movable with and relative to the blade.

11. In a spinner mounted on a propeller, the propeller comprising a hub having a socket from which a blade projects substantially radially through an opening in the spinner, said spinner having a generally conical compound-curved surface, inwardly disposed flanges beneath the spinner surface on the spinner bordering parts of the blade opening ahead of and behind the propeller plane of rotation, the transverse parts of the edges not being depressed in the plane of rotation, the inner edges of said flanges and said transverse parts defining a circular track which intercepts the normal surface of the spinner at at least two points adjacent said transverse parts, and a closure disc for said opening, bearing on said track and embracing said propeller blade and movable with and relative to the blade, said opening having a diameter only slightly greater than the chord of the blade where it intersects the spinner surface, and said disc having a substantially greater diameter, said disc outer portion underlying said spinner.

12. In a spinner mounted on a propeller, the propeller comprising a hub having a socket from which a blade projects substantially radially through an opening in the spinner, said spinner having a generally conical compound-curved surface, inwardly disposed flanges beneath the spinner surface on the spinner bordering parts of the blade opening ahead of and behind the propeller plane of rotation, the transverse parts of the edges not being depressed in the plane of rotation, the inner edges of said flanges and said transverse parts defining a circular track which intercepts the normal surface of the spinner at at least two points adjacent said transverse parts, and a closure disc for said opening, bearing on said track and embracing said propeller blade and movable with and reative to the blade, said opening having a diameter only slightly greater than the chord of the blade where it intersects the spinner surface, and said disc having a substantially greater diameter, said disc outer portion underlying said spinner, and means to support said disc against inward movement toward the propeller hub.

13. In a spinner mounted on a propeller, the propeller comprising a hub having a socket from which a blade projects substantially radially through an opening in the spinner, said spinner having a generally conical compound-curved surface, inwardly disposed flanges on the spinner bordering parts of the blade opening, the inner edges of said flanges defining a circular track which intercepts the normal surface of the spinner at at least two points, and a closure disc for said opening, bearing on said track and embracing said propeller blade and movable with and relative to the blade, said opening having a diameter only slightly greater than the chord of the blade where it intersects the spinner surface, and said disc having a substantially greater diameter, said disc outer portion underlying said spinner, an imperforate sleeve secured to the hub socket, embracing the blade and disc, and extending to the inside of said spinner, and a flange on the inner wall of said sleeve engaging the edge of said disc.

14. In a spinner mounted on a propeller, the propeller comprising a hub from which a blade projects substantially radially through an opening in the spinner, said spinner having generally conical compound-curved surfaces wherein the transverse curvature is sharper than the longitudinal curvature, said spinner near the edges of said blade opening being deformed inwardly ahead of and behind the propeller blade to an extent to make the opening edge circular and planar although the spinner form close to said opening and spaced from said edge is nonplanar, said circular planar edge having a circular planar track formed thereon, a spherically segmental blade seal disc embracing the blade, disposed within the spinner and bearing outwardly against said track, said seal disc being substantially larger in diameter than said circular track and lying within said spinner beyond the confines of said track, and means embracing the part of said blade within said spinner including a plane circular track engaging the edge of said disc and holding it outwardly in engagement with said first track.

15. A spinner construction according to claim 14 wherein said embracing means comprises an imperforate conical member sealingly secured to the spinner and hub to isolate the construction against airflow between the exterior and interior of said spinner.

References Cited in the file of this patent
UNITED STATES PATENTS

| | | |
|---|---|---|
| 2,289,400 | Woods | July 14, 1942 |
| 2,498,072 | Dean | Aug. 24, 1945 |
| 2,522,083 | Avondoglio | Sept. 12, 1950 |
| 2,612,227 | Cushman | Sept. 30, 1952 |

FOREIGN PATENTS

| | | |
|---|---|---|
| 532,127 | Great Britain | Jan. 17, 1941 |
| 569,167 | Great Britain | May 10, 1945 |
| 571,989 | Great Britain | Sept. 18, 1945 |
| 638,088 | Great Britain | May 31, 1950 |
| 882,261 | France | May 28, 1943 |
| 1,005,353 | France | Apr. 9, 1932 |